(12) United States Patent
Herbster

(10) Patent No.: US 10,772,254 B2
(45) Date of Patent: Sep. 15, 2020

(54) SEED COATING ASSEMBLY WITH ROTATABLE SEED SPREADER

(71) Applicant: USC, LLC, Sabetha, KS (US)

(72) Inventor: Marty Layne Herbster, Morrill, KS (US)

(73) Assignee: USC, LLC, Sabetha, KS (US)

( * ) Notice: Subject to any disclaimer, the term of this patent is extended or adjusted under 35 U.S.C. 154(b) by 229 days.

(21) Appl. No.: 15/803,121

(22) Filed: Nov. 3, 2017

(65) Prior Publication Data

US 2019/0133027 A1 May 9, 2019

(51) Int. Cl.
| | |
|---|---|
| *A01C 1/06* | (2006.01) |
| *A01C 1/08* | (2006.01) |
| *B02B 1/06* | (2006.01) |
| *B05B 3/10* | (2006.01) |

(52) U.S. Cl.
CPC ............... *A01C 1/06* (2013.01); *A01C 1/08* (2013.01); *B02B 1/06* (2013.01); *B05B 3/1014* (2013.01); *B05B 3/1021* (2013.01)

(58) Field of Classification Search
CPC ..................................... A01C 1/06; A01C 1/08
See application file for complete search history.

(56) References Cited

U.S. PATENT DOCUMENTS

| | | | | |
|---|---|---|---|---|
| 4,657,773 A | * | 4/1987 | Mueller | B05B 3/105 427/4 |
| 4,971,818 A | * | 11/1990 | Pye | B05B 5/087 426/237 |
| 5,488,898 A | * | 2/1996 | Hough | A23B 4/10 366/146 |
| 5,891,246 A | * | 4/1999 | Lund | A01C 1/06 118/13 |
| 6,551,402 B1 | | 4/2003 | Renyer et al. | |
| 6,783,082 B2 | | 8/2004 | Renyer et al. | |
| 9,675,001 B2 | * | 6/2017 | Meyer | A01C 1/00 |
| 2010/0267554 A1 | * | 10/2010 | Madsen | A01C 1/06 504/100 |
| 2011/0000411 A1 | * | 1/2011 | Ruban | A01C 1/02 111/200 |
| 2011/0027479 A1 | * | 2/2011 | Reineccius | A01C 1/06 427/212 |
| 2014/0033972 A1 | * | 2/2014 | Meyer | A01C 1/06 118/303 |
| 2014/0309108 A1 | * | 10/2014 | Schreurs | A01N 43/90 504/100 |
| 2014/0373441 A1 | * | 12/2014 | Kaeb | A01C 1/00 47/57.6 |

* cited by examiner

*Primary Examiner* — Monica L Barlow
(74) *Attorney, Agent, or Firm* — Hovey Williams LLP

(57) ABSTRACT

A seed coating assembly (16) includes a housing (36) with a high-speed rotary coating atomizer (66) therein, and a relatively slow speed rotatable body (42) equipped with through-slots (44) located above the atomizer (66) in a location to divert and evenly spread incoming seeds prior to coating thereof. The body (42) is preferably a substantially circular disk mounted coaxially with the atomizer (66) at a distance of from about 1.5-10 inches above the atomizer (66).

30 Claims, 4 Drawing Sheets

SEED COATING ASSEMBLY WITH ROTATABLE SEED SPREADER

BACKGROUND OF THE INVENTION

Field of the Invention

The present invention is concerned with improved rotary atomizer seed coating assemblies designed to rapidly and evenly coat agricultural seeds with desired coating(s). More particularly, the invention relates to such seed coating assemblies, complete coating apparatus including the coating assemblies, and corresponding coating methods, wherein incoming seeds are diverted and evenly spread by means of a rotatable body, such as a circular plate equipped with seed-clearing through-slots, located above the atomizer; the body is rotated at a much slower speed than the atomizer to achieve the best coating results.

Description of the Prior Art

It is a common practice in modern-day agriculture to coat agricultural seed of various types with coating materials (e.g., pesticides, fungicides, or fertilizers such as micronutrients). Efficient seed coating apparatus has been developed to allow seed companies and distributors to rapidly and conveniently coat seeds to the specifications desired by users. For example, USC, LLC, of Sabetha, Kans., commercializes several different types of seed coaters. These units typically make use of rotary atomizers which include a pressurized liquid supply surrounded by a rotary cage. See U.S. Pat. Nos. 6,551,402 and 6,783,082. With such prior atomizer designs, a generally conical, static diverter is placed above the atomizer in an effort to evenly spread incoming seed to obtain uniform coating. However, it sometimes occurs that the static diverter does not provide the requisite degree of seed spreading, with the result that seeds may be unevenly coated, or the rate of seed coating must be reduced in order to properly coat the seeds.

There is accordingly a need in the art for improved seed coating assemblies which assure substantially even seed distribution during the coating operation, even at high seed through-puts.

SUMMARY OF THE INVENTION

The present invention overcomes the problems outlined below, and provides a seed coating assembly broadly comprising a seed coating housing with a rotary atomizer operable to generate a spray of coating liquid within the seed coating housing, and a rotatable spreader body located above the atomizer and operable to spread incoming seed to be coated for passage of the seed into said spray of coating liquid. The spreader body comprises a rotatable plate having a plurality of seed-spreading through-slots, and is advantageously in the form of a substantially circular plate. In an embodiment, the spreader body is rotated by means of a variable speed drive operably coupled with the spreader body in order to rotate the spreader body at a rotational speed of from about 25-125 rpm. For best results, the spreader body is spaced above said atomizer a distance of from about 1.5-10 inches. The spreader body may be of any desired shape, such as circular, square, or octagonal, and is usually mounted for rotation about an axis coincident with the rotational axis of the atomizer.

A complete coating apparatus in accordance with the invention has a seed coating housing with a rotary atomizer operable to generate a spray of coating liquid within the seed coating housing, and a slotted, rotatable spreader body located above the atomizer and operable to disperse and spread the incoming seed prior to coating thereof. The housing also has a tubular seed input above the housing and in communication with the latter as well as a coated seed outlet below said atomizer. Such apparatus also may have a rotary drying/finishing drum below said coated seed outlet.

The methods of the invention comprise the steps of introducing seeds into a seed coating housing having therein a rotary atomizer operable to generate a spray or fog of coating liquid within said seed coating housing, and spreading the introduced seeds above said spray or fog of coating liquid by causing the seeds to impinge upon a rotary spreader body comprising a rotatable plate having a plurality of seed-spreading through-slots. In such methods, the spreader body is preferably rotated at a speed of from about 25-125 rpm, substantially slower than the rotational speed of the atomizer.

DETAILED DESCRIPTION OF THE PREFERRED EMBODIMENT

Figure 1:
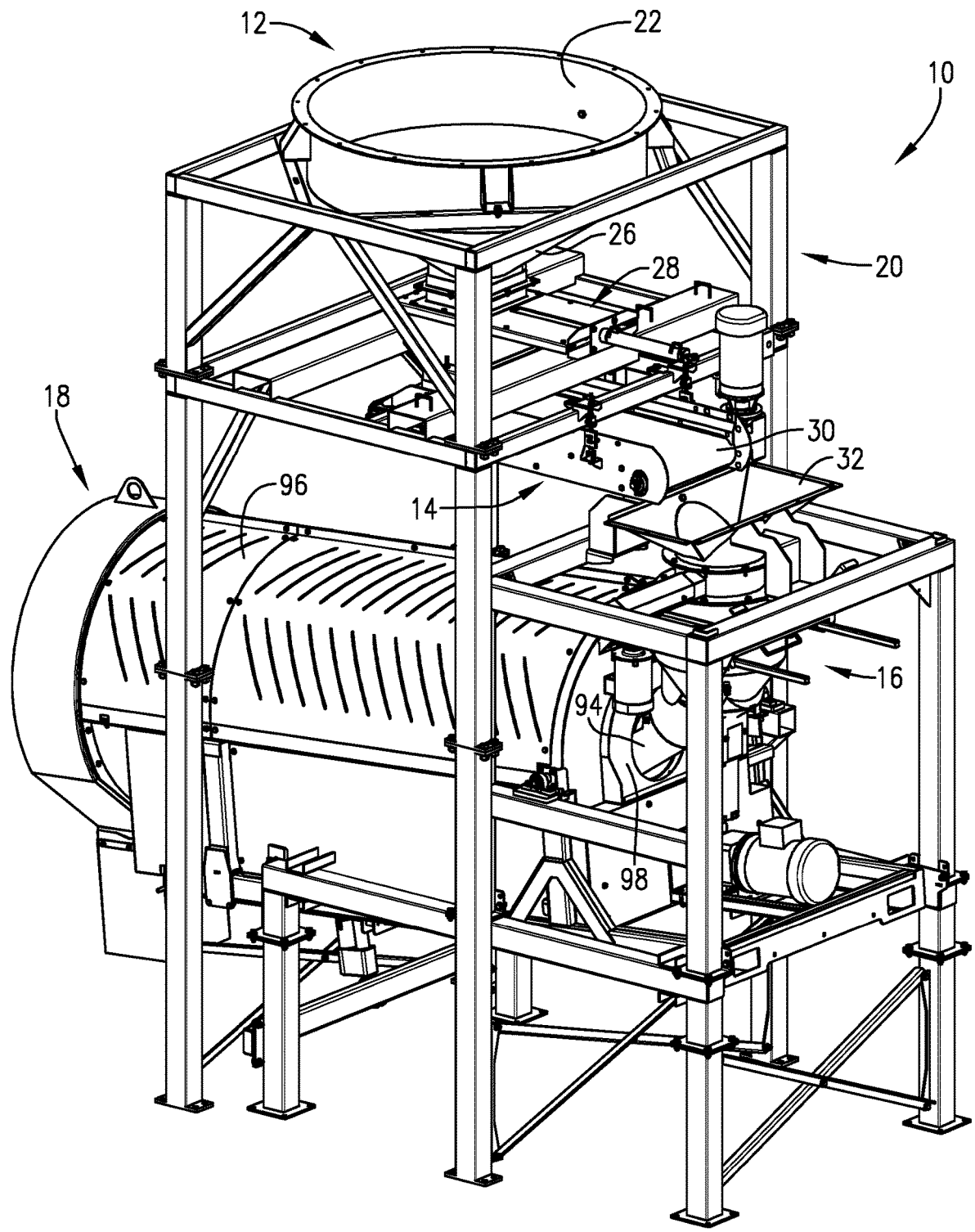
FIG. 1 is a perspective view of seed coating apparatus including the improved coating assembly of the invention.
Figure 2:
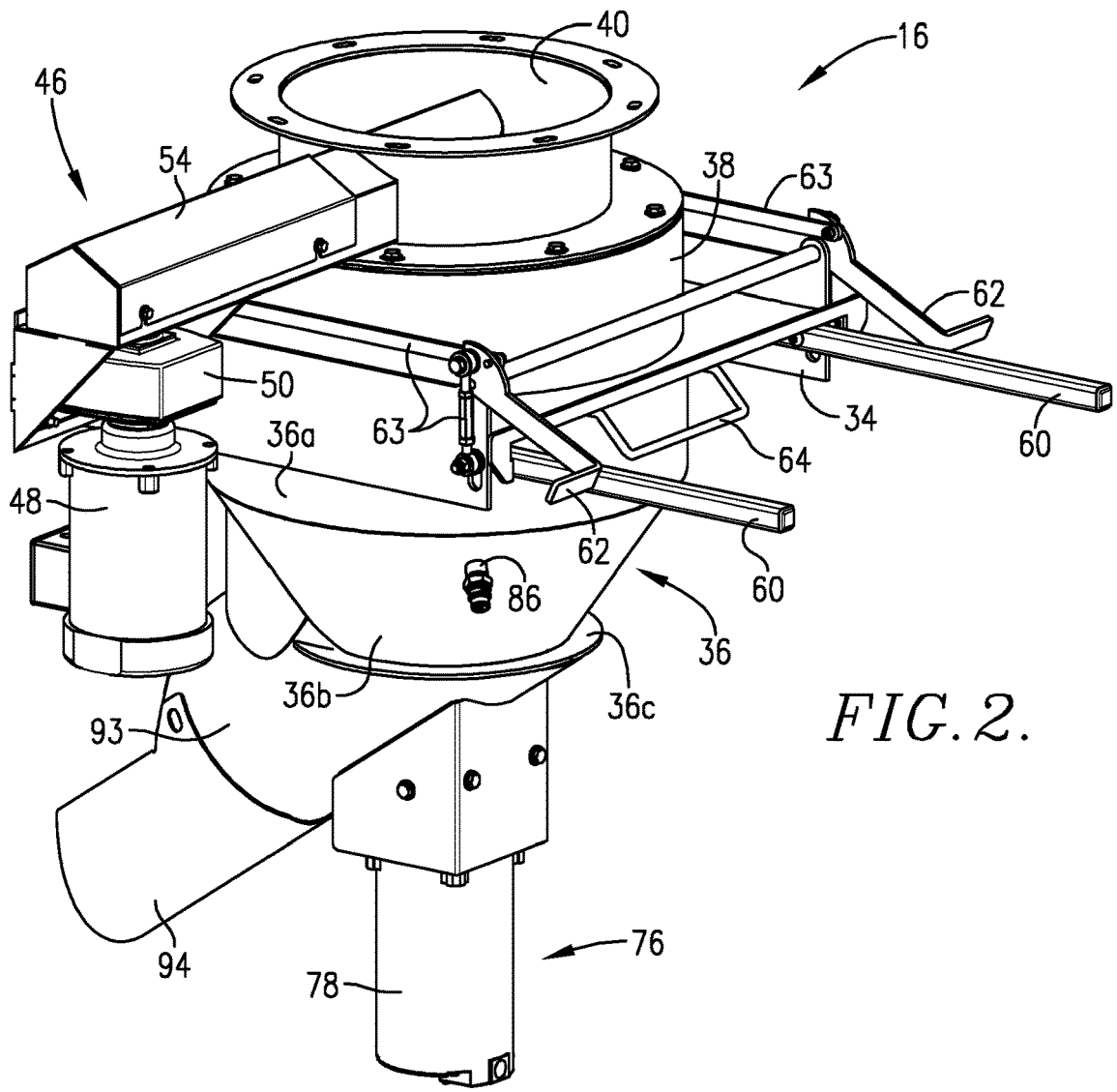
FIG. 2 is a perspective view of the seed coating assembly.
Figure 3:
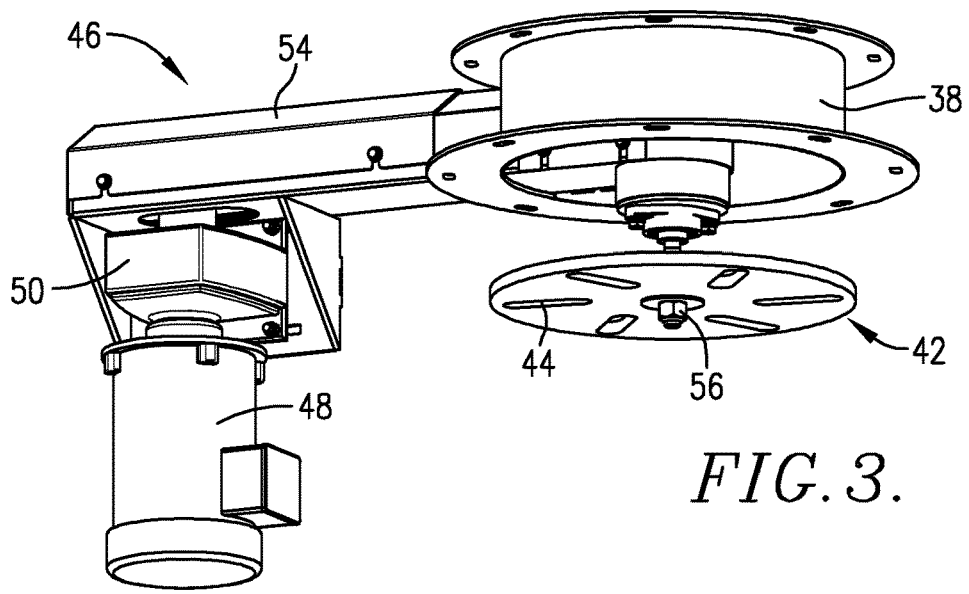
FIG. 3 is a bottom perspective view illustrating the rotatable seed spreader disk unit forming a part of the coating assembly.
Figure 4:
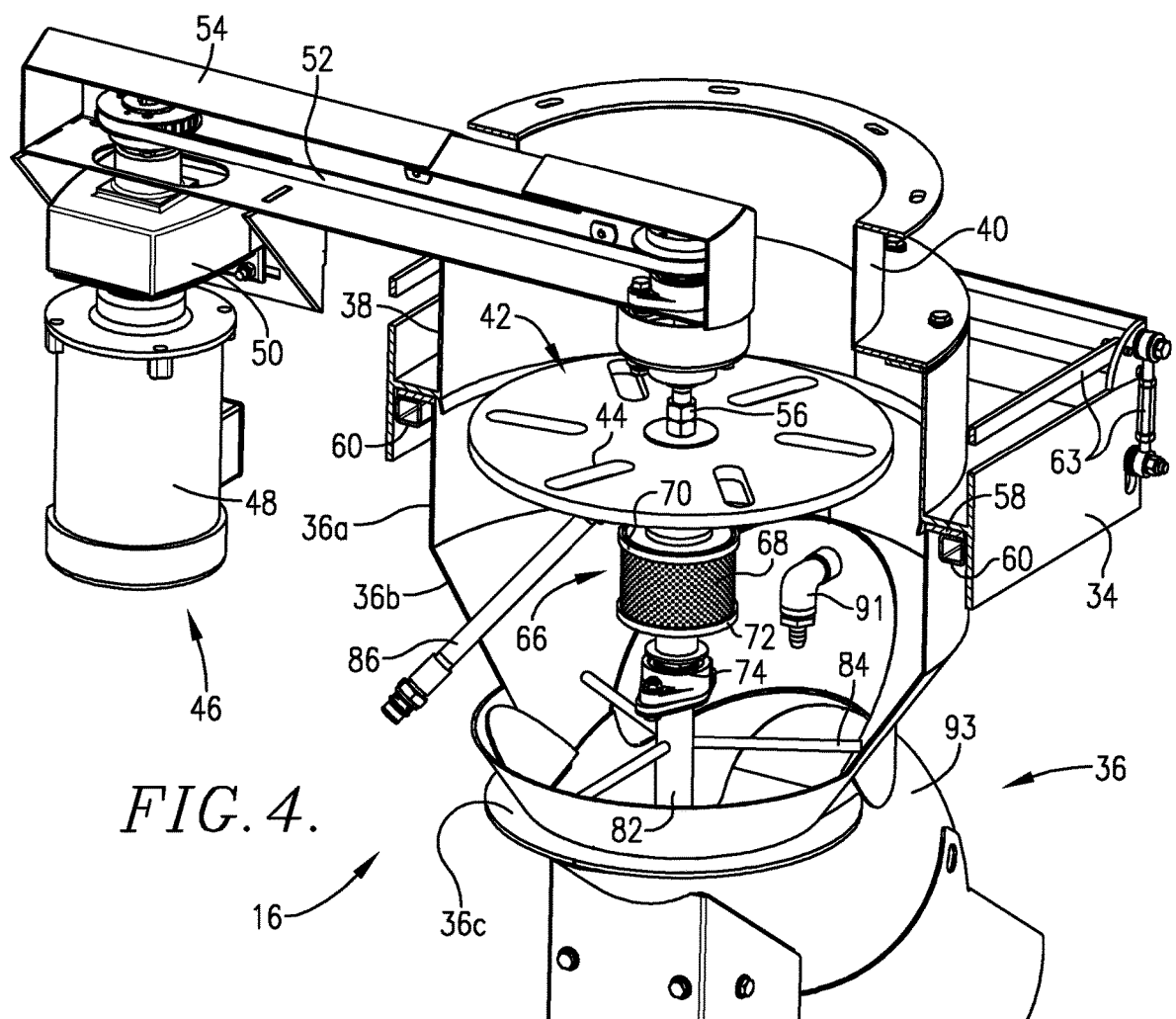
FIG. 4 is another perspective view of the seed coating assembly, with parts broken away to reveal the internal construction of the coating assembly.
Figure 6:
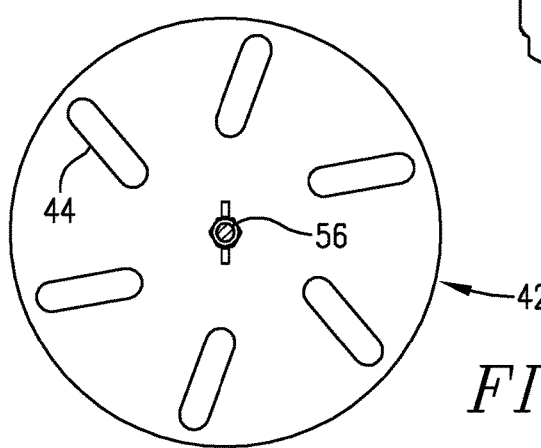
FIG. 6 is a plan view of the spreader disk.
Figure 5:
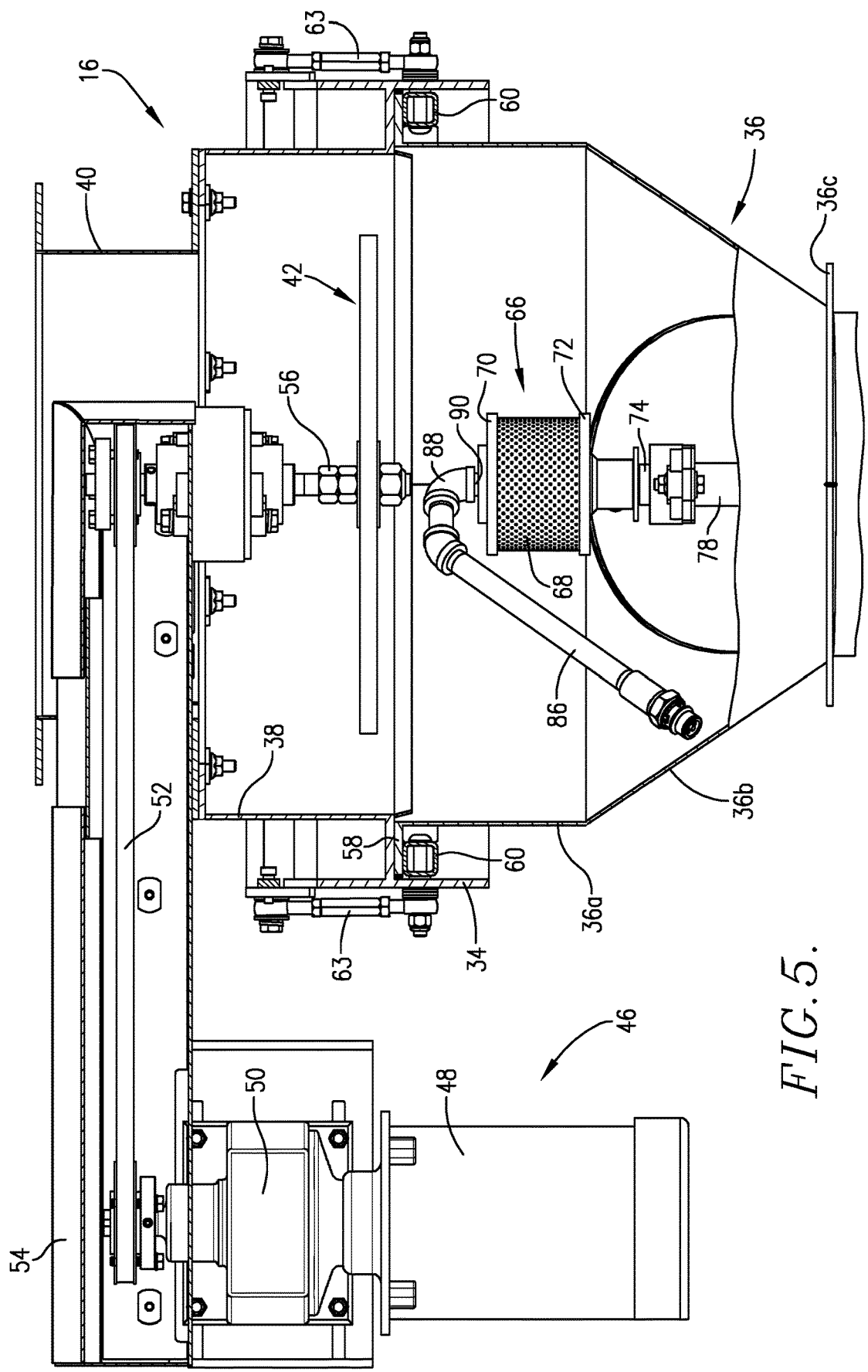
FIG. 5 is an elevational view of the seed coating assembly, with parts broken away.

Turning now to the drawings, a seed coating apparatus 10 is illustrated in FIG. 1 and broadly includes an uppermost seed inlet 12, a weigh belt assembly 14 below the inlet 12, a seed coating assembly 16 beneath the weigh belt assembly 14, and a lowermost rotatable drying/finishing drum unit 18. As illustrated, the components 12-18 are supported on an upright frame 20.

The seed inlet 12 includes an upstanding tubular member 22, with an inwardly tapered outlet 26 located beneath the member 22 in order to deliver incoming seed to the weigh belt assembly 14. To this end, member 22 allows gravitational flow of seed into and through the outlet 26. A shiftable slide gate 28 is located between the outlet 26 and weigh belt assembly 14, in order to control the flow of seed into apparatus 10. The weigh belt assembly 14 includes a powered, shiftable conveyor belt 30 with associated weighing apparatus, in the form of four frame-supported suspension load sensors, serving to accurately and continuously weigh the incoming seed. The belt 30 in turn feeds the seed to a rectangular, tapered inlet chute 32 located directly above the seed coating assembly 16.

Attention is next directed to FIGS. 2-6, which illustrate the seed coating assembly 16. The assembly 16 includes a stationary box frame 34 supported by the overall frame 20, and a shiftable housing 36 supported by box frame 34. The box frame 34 has an upstanding, tubular transition 38 surmounted by a concentric, tubular inlet 40. A rotatable seed-spreading body 42, in this embodiment in the form of a substantially circular plate, is located within transition 38, with the periphery of the body 42 spaced from the interior surface of the transition 38. The body 42 has a plurality of through-slots 44, each located along a respective chord of the body 42. The body 42 is rotated by means of a variable speed drive assembly 46 including a drive motor 48 and controller 50. The output of motor 48 is coupled with a conventional belt drive 52 (FIG. 4) covered with hood 54, and terminating with a depending coupler 56 supporting body 42. The drive assembly 46 is designed to rotate the body 42 at a speed typically ranging from about 25-125 rpm.

The housing 36 is supported by a slide plate 58 slidably mounted on a pair of spaced apart, side-marginal slide rails 60 coupled to a pair of actuating levers 62 through linkage 63 located at the four corners of box frame 34. The housing 36 includes an upper cylindrical section 36*a*, an inwardly tapered conical section 36*b*, and a bottom plate 36*c*. The housing 36 may be moved from the operative position illustrated in FIGS. 4 and 5 to a displaced position permitting access to the interior of the housing 36 for cleaning or the like. The actuating levers 62 may be manipulated to selectively lower the slide arms 60 supporting the housing 36 from the operative position to a shift position, whereupon the handle 64 may be grasped to pull the housing 36 outwardly to the displaced position thereof (not shown).

The interior of housing 36 includes a rotary atomizer 66 of the type described in U.S. Pat. Nos. 6,551,402 and 6,783,082, both of which are incorporated by reference herein in their entireties. Specifically, the atomizer 66 includes an outer, perforate cage 68 with upper and lower endplates 70 and 72. The cage 68 is supported for rotation on a shaft 74 oriented such that the axes of rotation of the atomizer and the body 42 are coincident. The shaft 74 is operatively coupled to a lower, variable speed drive assembly 76, including a drive motor 78 and controller 80. An outer, stationary tube 82 is disposed about the shaft 74 and has three radially extending reinforcing struts 84, which engage the inner surface of housing 36.

In order to supply coating liquid to the atomizer 68, a supply pipe 86 is provided, which extends obliquely upwardly and terminates with an elbow 88 and apertured supply fitting 90 extending into the confines of cage 68. A liquid conduit (not shown) extends from the lower end of supply pipe 86 to a source of coating liquid. The drive assembly 76 is operable to rotate the cage 68 at relatively high speeds of from about 1000-2500 rpm in order to create a very fine spray or fog of coating liquid within the housing 36. In addition, a secondary fluid inlet 91, for seed inoculants or any other desired secondary treating product, extends through housing 36 and is adapted to be coupled with a source of secondary product (not shown).

A tubular output 92 is coupled to section 36*b* and supports an obliquely extending chute 93, which serves to deliver coated seed via a secondary chute 94 (FIG. 1) to the interior of drum unit 18. The latter has a vented, outermost shell 96 with an elongated, axially rotatable, internally flighted drying/finishing drum 98 within the shell 96.

Operation

In order to properly coat seeds in assembly 16, the seed is first introduced into seed inlet 12 and is weighed via weigh belt assembly 14. The seed then passes through inlet chute 32 and then into and through the tubular inlet 40. The seed thus gravitates towards and impinges upon the rotating body 42, which, owing to the presence of the slots 44 and the location of the body 42 within housing 36, evenly distributes the seed around the atomizer 66. The coating liquid is simultaneously delivered through the supply pipe 86 and elbow 88 under pressure, and thus passes outwardly through the rapidly rotating cage 68 to create the desired fog or spray of coating liquid. As the descending seed passes through this fog or spray, it is coated and thereupon passes into delivery chute 92 for ultimate delivery into the confines of drum 98 for final drying and finishing.

In order to achieve the most desirable coating of seed, it has been found that the body 42 should be located in relatively close proximity to the atomizer 66, specifically from about 1.5-10 inches (more preferably from about 2-5 inches) between the bottom surface of body 42 and the upper surface of end plate 70. Furthermore, the speed of rotation of the body 42 should be substantially less than that of the atomizer 66. Hence, the ratio of the rotatable speed of the atomizer to the rotational speed of the spreader body should range from about 8-400, more preferably from about 15-40. Finally, the slots 44 should have a length of from about 2-5 inches and a width of from about 0.5-1.5 inches. A wide variety of seeds may be coated in accordance with the invention, e.g., corn, soy, wheat, barley, rice, beans, peas, oats, cotton, and grass; of course, the dimensions and operating parameters of the coating assemblies used may be varied in light of the seed being coated.

I claim:

1. A seed coating assembly comprising:
   a seed coating housing;
   a rotary atomizer operable to generate a spray or fog of coating liquid within said seed coating housing;
   a rotatable spreader body located above said atomizer and operable to spread incoming seed to be coated for passage of the seed into said spray or fog of coating liquid, said body comprising a rotatable plate having a plurality of seed-spreading through-slots; and
   a drive assembly operably coupled with said spreader body in order to rotate the spreader body at a revolutions-per-minute (rpm) rate.

2. The coating assembly of claim 1, including a variable speed drive operably coupled with said spreader body in order to rotate the spreader disk at a rotational speed of from about 25-125 rpm.

3. The coating assembly of claim 1, said spreader body comprising a substantially circular plate.

4. The coating assembly of claim 3, said through-slots being located along respective chords of said substantially circular plate.

5. The coating assembly of claim 1, said spreader body spaced above said atomizer a distance of from about 1.5-10 inches.

6. The coating assembly of claim 5, said distance being from about 2-5 inches.

7. The coating assembly of claim 1, including a drive coupled to said atomizer for rotation thereof at a speed of from about 1000-2500 rpm.

8. The coating assembly of claim 1, the ratio of the rotatable speed of said atomizer to the rotational speed of said spreader body ranging from about 8-400.

9. The coating assembly of claim 8, said ratio being from about 15-40.

10. The coating assembly of claim 1, each of said slots having a width of from about 0.5-1.5 inches and a length of from about 2-5 inches.

11. The coating assembly of claim 1, including a tubular seed input above said housing and in communication with the latter, and a coated seed outlet below said atomizer.

12. Seed coating apparatus comprising:
   a seed coating housing;
   a rotary atomizer operable to generate a spray or fog of coating liquid within said seed coating housing;

a rotatable spreader body located above said atomizer and operable to spread incoming seed to be coated for passage of the seed into said spray or fog of coating liquid, said body comprising a rotatable plate having a plurality of seed-spreading through-slots;

a drive assembly operably coupled with said spreader body in order to rotate the spreader body at a revolutions-per-minute (rpm) rate;

a tubular seed input above said housing and in communication with the latter; and a coated seed outlet below said atomizer.

13. The apparatus of claim 12, including a rotary drying/finishing drum below said coated seed outlet.

14. The apparatus of claim 12, including a variable speed drive operably coupled with said spreader body in order to rotate the spreader disk at a rotational speed of from about 25-125 rpm.

15. The apparatus of claim 12, said spreader body comprising a substantially circular plate.

16. The apparatus of claim 15, said through-slots being located along respective chords of said substantially circular plate.

17. The apparatus of claim 12, said spreader body spaced above said atomizer a distance of from about 1.5-10 inches.

18. The apparatus of claim 17, said distance being from about 2-5 inches.

19. The apparatus of claim 12, including a drive coupled to said atomizer for rotation thereof at a speed of from about 1000-2500 rpm.

20. The apparatus of claim 12, the ratio of the rotatable speed of said atomizer to the rotational speed of said spreader body ranging from about 8-400.

21. The apparatus of claim 20, said ratio being from about 15-40.

22. The apparatus of claim 12, each of said slots having a width of from about 0.5-1.5 inches and a length of from about 2-5 inches.

23. A method of coating seeds comprising the steps of:
introducing seeds into a seed coating housing having therein a rotary atomizer operable to generate a spray or fog of coating liquid within said seed coating housing;

spreading said introduced seeds above said spray or fog of coating liquid by causing the seeds to impinge upon a rotary spreader body and then pass through said spray or fog in order to coat said seeds, said spreader body comprising a rotatable plate having a plurality of seed-spreading through-slots, and rotating said spreader body at a revolutions-per-minute (rpm) rate during said seed-spreading and seed-coating steps.

24. The method of claim 23, including the step of rotating the spreader body at a rotational speed of from about 25-125 rpm.

25. The method of claim 23, said spreader body comprising a substantially circular plate.

26. The method of claim 25, said through-slots being located along respective chords of said substantially circular plate.

27. The method of claim 23, said spreader body spaced above said atomizer a distance of from about 1.5-10 inches.

28. The method of claim 23, including the step of rotating said atomizer at a speed of from about 1000-2500 rpm.

29. The method of claim 23, the ratio of the rotatable speed of said atomizer to the rotational speed of said spreader body ranging from about 8-400.

30. The method of claim 23, each of said slots having a width of from about 0.5-1.5 inches and a length of from about 2-5 inches.

* * * * *